(12) United States Patent
Oh

(10) Patent No.: US 6,314,087 B1
(45) Date of Patent: Nov. 6, 2001

(54) METHOD FOR DETERMINING TRAFFIC PRIORITY ORDER ON NETWORK

(75) Inventor: Joong Chan Oh, Kyungki-do (KR)

(73) Assignee: Hyundai Electronics Industries Co., Ltd., Kyoungki-Do (KR)

( * ) Notice: Subject to any disclaimer, the term of this patent is extended or adjusted under 35 U.S.C. 154(b) by 0 days.

(21) Appl. No.: 09/053,703

(22) Filed: Apr. 2, 1998

(30) Foreign Application Priority Data

Apr. 2, 1997 (KR) .................................................. 97-12213

(51) Int. Cl.[7] .................................................. H04L 12/26
(52) U.S. Cl. ............................................ 370/252; 370/412
(58) Field of Search .................................. 370/252, 231, 370/228, 412, 449, 413, 468, 395, 398, 447, 455, 537, 352, 389, 436, 342, 347, 332, 263, 480, 453, 416, 448, 444, 420, 89, 61, 85.6, 85.2, 85.5, 85, 503; 709/212, 225, 236, 250, 249, 240; 395/825.05, 200.15

(56) References Cited

U.S. PATENT DOCUMENTS

| | | | |
|---|---|---|---|
| 4,459,588 | * | 7/1984 | Grow .............................. 340/825.05 |
| 4,803,681 | * | 2/1989 | Takahashi .............................. 370/85 |
| 4,819,229 | * | 4/1989 | Pritty et al. .............................. 370/89 |
| 5,272,701 | * | 12/1993 | Tsuruoka .............................. 370/85.2 |
| 5,402,423 | * | 3/1995 | Van Kersen et al. ............... 370/85.6 |
| 5,541,919 | * | 7/1996 | Yong et al. .............................. 370/416 |
| 5,553,073 | * | 9/1996 | Barraclough et al. .............. 370/85.5 |
| 5,557,612 | * | 9/1996 | Bingham .............................. 370/449 |
| 5,596,695 | * | 1/1997 | Hamada et al. ..................... 395/333 |
| 5,623,490 | * | 4/1997 | Richter et al. ....................... 370/263 |
| 5,644,573 | * | 7/1997 | Bingham et al. ..................... 370/503 |
| 5,673,259 | * | 9/1997 | Quick, Jr. ............................. 370/342 |
| 5,682,386 | * | 10/1997 | Arimilli et al. ...................... 370/468 |
| 5,699,521 | * | 12/1997 | Iizuka et al. ..................... 395/200.15 |
| 5,757,801 | * | 5/1998 | Arimilli ............................... 370/444 |
| 5,995,491 | * | 11/1999 | Richter et al. ....................... 370/263 |

OTHER PUBLICATIONS

"Intel 82557 Fast Ethernet PCI Bus Controller," Intel Corporation, Oct. 1996, pp. 1–57.

* cited by examiner

Primary Examiner—Salvatore Cangialosi
(74) Attorney, Agent, or Firm—Birch, Stewart, Kolasch & Birch, LLP

(57) ABSTRACT

Disclosed is a method for determining a traffic priority order on a network, which is suitable for efficient data transmission by determining priority order depending on multimedia data characteristics and normal data characteristics. The method for determining a traffic priority order on a network includes the steps of detecting the traffic generating frequency and/or the size of data being transmitted between respective stations, identifying data between respective stations as multimedia data if a traffic generating frequency and/or a data size is greater than a reference value, identifying data between respective stations as normal data if a traffic generating frequency and/or data size is lower than a reference value, granting the most significant priority order to multimedia data having traffic generating frequency and/or data size greater than corresponding reference values, determining whether a destination station can receive data or not, and reading data from a memory depending on priority order and transferring data to a destination station when that station is able to receive data.

20 Claims, 5 Drawing Sheets

METHOD FOR DETERMINING TRAFFIC PRIORITY ORDER ON NETWORK

BACKGROUND OF THE INVENTION

1. Field of the Invention

The present invention relates to a method for performing data communication, and more particularly, to a method for determining a traffic priority order on a network that is suitable for efficient data transmission in accordance with multimedia data characteristics and normal data characteristics, regardless of increases in local area network (LAN) traffic.

2. Discussion of the Related Art

Recently, due to increases in the amount of traffic communicated over networks, rapid increases in load have been experienced. Consequently, delays have been experienced in transmissions of multimedia data, such as moving picture data, which require real time processing.

Conventional networks typically communicate data based on a first-in-first-out protocol. A conventional method fox determining a priority order for traffic communicated over a network will be described with reference to the accompanying drawings.

FIG. 1 is a schematic block diagram illustrating a relationship between a switching hub and respective stations on a network. As illustrated in FIG. 1, the network includes a switching hub 11 and a plurality of stations 12 that are connected to the switching hub 11 for data communication. stations 12 that are connected to the switching hub 11 for data communication.

Software 11a is mounted in the switching hub 11 to control the hub. The software 11a transfers data received from a source station 12 to a random destination station in accordance with a priority order.

A network interface card (NIC) 12b and a software driver 12a are mounted in each station 12. The NIC 12b enables data communication with the switching hub 11. The software driver 12a controls the NIC 12b.

As illustrated in FIG. 2, the switching hub 11 includes a memory 11b for temporarily storing data received from a source station 12, a controller 11c for controlling the memory 11b, and a plurality of Ethernet interfaces 13 connected in parallel to the controller 11c for converting data to comply with a protocol for data communication between source and destination stations 12. The Ethernet interfaces 13 convert data received from the software driver 12a, which is mounted in the respective station 12, into a format complying with Ethernet protocol.

The operation of the aforementioned network will be described below.

When data is simultaneously transmitted from stations A and C to station B, the switching hub 11 initially transfers data from only station A to station B. The data transferred from station C is temporarily stored in the memory 11b and subsequently transferred to station B after the transmission of data from station A to station B has been completed.

On the other hand, if the data transferred from station A has been temporarily stored in the memory 11b, data can be transferred from station C to station B prior to transmission of the data stored in memory 11b. When data transmission from station C to station B is completed, the data from station A that has been stored in the memory 11b can be transferred to station B.

Priority order that is used to control whether data from station A or station C will be given priority for transfer to station B is determined based on the sequence of data received by switching hub 11.

FIG. 3 is a flow chart illustrating a conventional method for determining a traffic priority order for a network. As illustrated in FIG. 3, data that is received by the memory 11b from a plurality of stations 12 (101) is read in the sequence received.

It is then determined whether or not a destination station can receive data (102). If the destination station can receive data, the data read from the memory 11b is transferred to the destination station (103). It is then determined whether or not the transmission of data being transferred in step 103 has been completed (104). If not completely transmitted, data transmission continues Once completely transmitted, data subsequently received by the memory 11b is read (105).

The data transmission between the respective stations can be performed by the above-described steps.

However, the conventional method for determining traffic priority order on a network has several problems. For instance, when the data processing is performed based only on the sequence of arrival to the memory, without regard for regular priority order, urgent and non-urgent multimedia data are not distinguished. Consequently, unacceptable delays are experienced by urgent multimedia data. Specifically, data that requires real time processing is not given priority over other less urgent data, such as E-mail that does not cause any problems even if data transmission is delayed are processed. For this reason, problems are experienced in real time processing of multimedia data, diminishing network efficiency.

SUMMARY OF THE INVENTION

The present invention is directed to a method for determining traffic priority order on a network that substantially obviates one or more of the problems caused by limitations and disadvantages of the related art.

An object of the present invention is to provide a method for determining a traffic priority order for a network, which method is suitable for efficient data transmission in accordance with respective data characteristics by promptly processing multimedia data.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and specifically described, a method for determining a traffic priority order for data to be transmitted over network according to the present invention includes the steps of detecting information including at least one of a traffic generating frequency and a size of data to be transferred between respective stations, granting priority order to data based on the detected information, determining whether a destination station is ready to receive data, reading data from a memory based on an associated priority order, and transferring the read data to the destination station when the destination station is ready to receive data. A higher priority order is granted when a higher information is detected. Specifically, the priority order is granted by comparing the detected information to a threshold, and granting a most significant priority order to data when the detected information exceeds the threshold. When multiple data have been granted a same priority order, the priority order among those data is changed based on an order that the data is received for transmission.

The data to be transmitted between respective stations is determined to be multimedia data if the detected information is greater than the threshold, and normal data if the detected information is lower than the threshold.

The present invention also includes an apparatus for determining a traffic priority order for data to be transmitted over a network, capable of performing the above-described steps.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED

Reference will now be made in detail to the preferred embodiments of the present invention, examples of which are illustrated in the accompanying drawings, particularly FIGS. 4 and 5.

Priority order in traffic routing is determined by two factors according to the present invention, traffic generating frequency and data size, each of which is generated between two stations, traffic generating frequency being generated for certain time periods.

Generally, multimedia data includes a combination of picture data and sound data, such as a moving picture conference. Therefore, communication of multimedia data results in generation of high volume of traffic for a short time period. That is, traffic generating frequency is high and data size is very large.

By contrast to multimedia data, normal data such as E-mail has a small size and its traffic generating frequency is low.

The priority order is determined considering multimedia data characteristics and normal data characteristics. If the priority order is determined, data is processed based on the determined priority order instead of a conventional first input first-out order.

As a result, multimedia data requiring real time processing can be assigned the most significant priority order, entitling it to processing before other, less urgent data. Normal data which can be assigned no relation to transmission speed has relatively low priority order.

The method for determining a traffic priority order on a network according to the present invention will be described with reference to FIG. 4.

Figure 1:
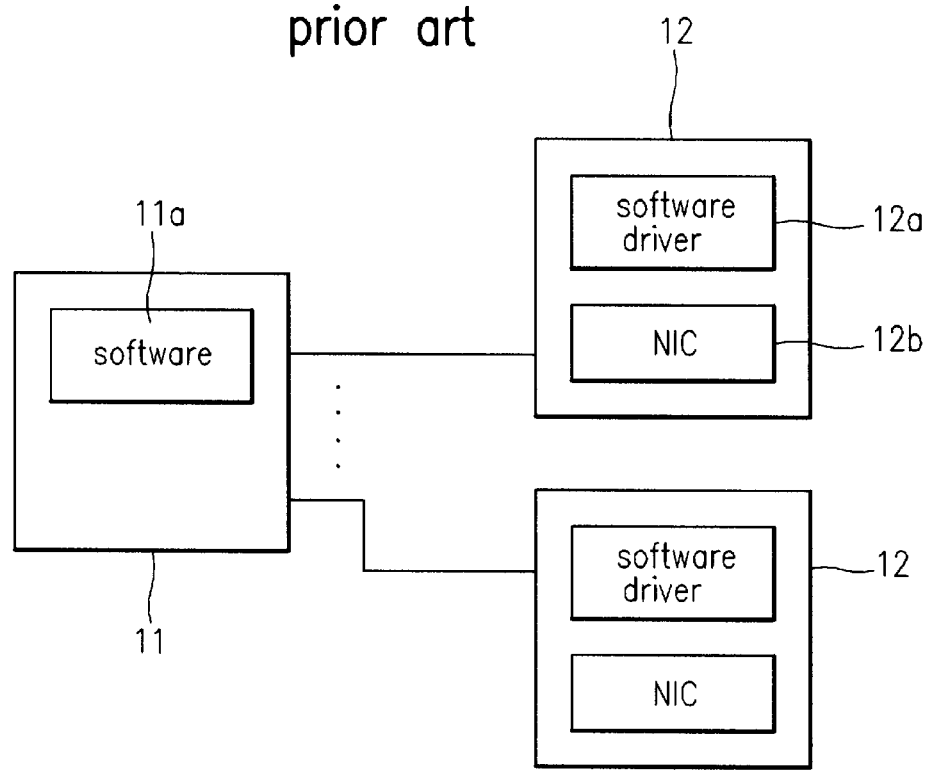
FIG. 1 is a schematic block diagram illustrating a relationship between a switching hub and respective stations in a conventional network.
Figure 2:
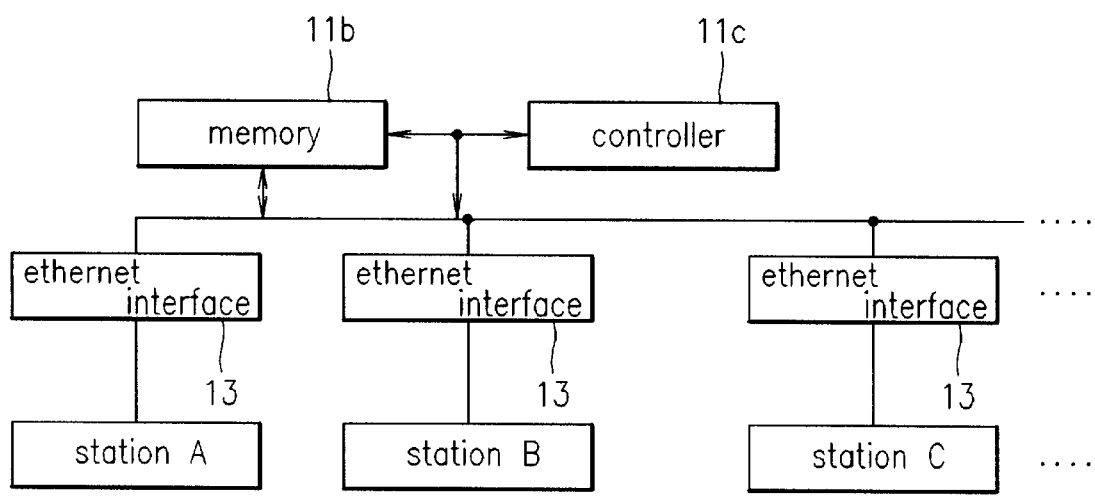
FIG. 2 is a schematic block diagram of the switching hub of FIG. 1.
Figure 3:
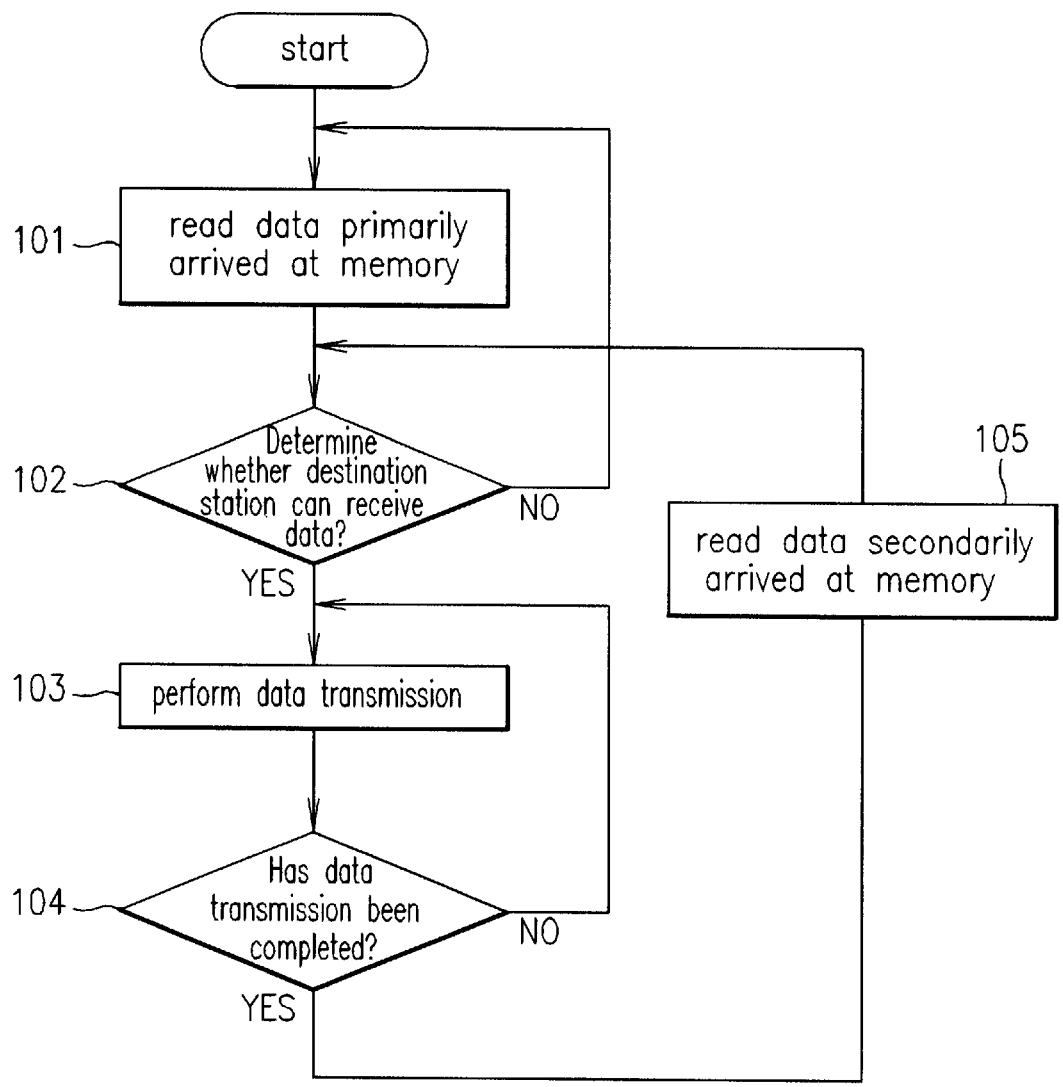
FIG. 3 is a flow chart illustrating a conventional method for determining a traffic priority order on a network.
Figure 4:
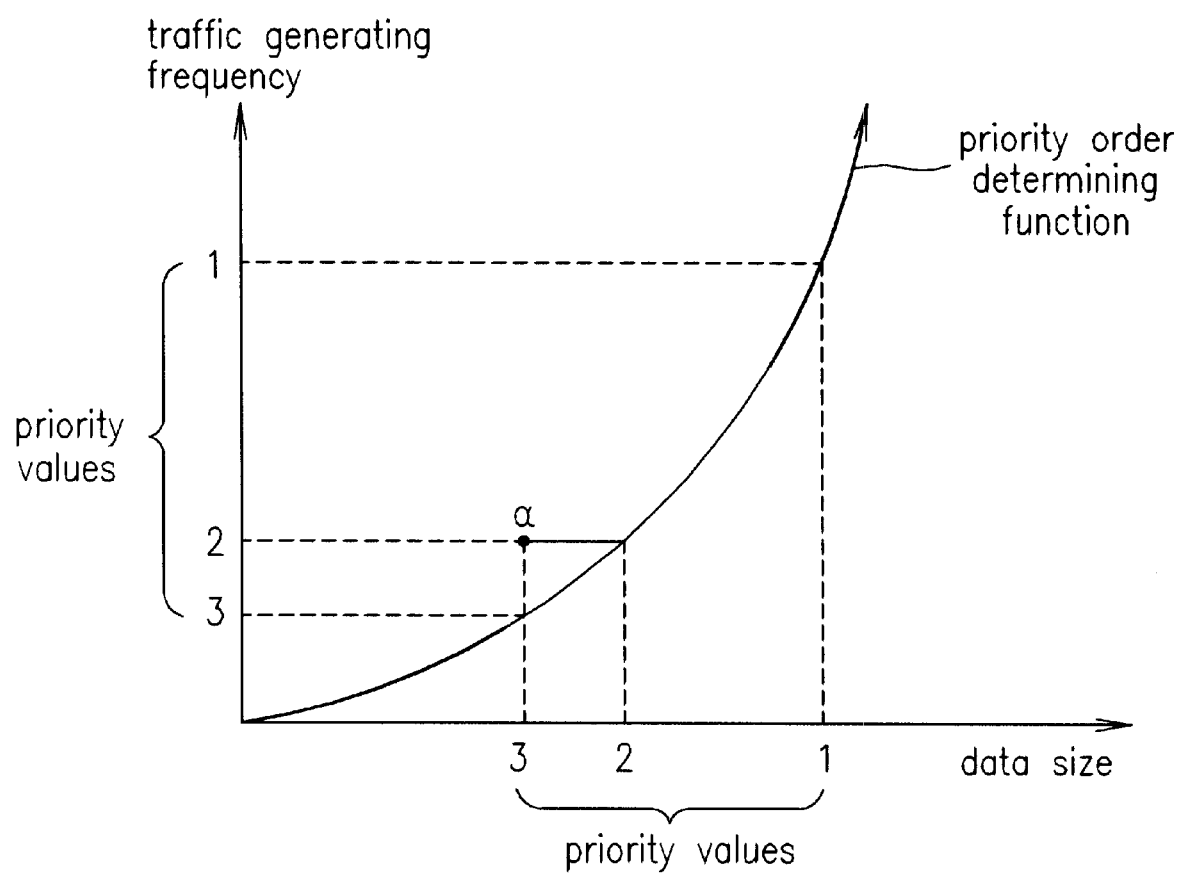
FIG. 4 shows a priority order determining function illustrating a method for determining a traffic priority order on a network according to the present invention.

As illustrated using random point $\alpha$ in FIG. 4, traffic between nodes that are away from the priority order determining function can be determined to be either priority order 2 or priority order 3 depending upon the mapping to the priority order determining function. For instance, if the priority order determining reference is set to traffic generating frequency, the random point $\alpha$ is determined to be priority order 2. By contrast, if the priority order determining reference is set to the data size, the random point $\alpha$ is determined to be priority order 3.

The method for determining a traffic priority order on a network based on traffic generating frequency will be described with reference to FIG. 5. As illustrated in FIG. 5, the traffic generating frequency between two stations is detected (201). If the traffic generating frequency is greater than a reference value, data being transmitted between the two stations is determined to be multimedia data, which is granted the most significant priority order. If traffic generating frequency is lower than a reference value, data being transmitted between the two stations is determined to be normal data, which is granted a priority order lower than that granted multimedia data (202). For instance, as shown in FIG. 4, when traffic generating frequency is used as a basis for determining priority order, the random point $\alpha$ is mapped along a horizontal plane to the priority order determining function which corresponds to the priority order of 2.

Once priority orders have been preliminarily granted as described above, it is determined whether several different pieces of data have been granted the same priority order. If so, data that has been granted the same priority is distinguished based on the order in which is was received by the memory. As such, the priority order and the reproduction order of data granted the same priority order in step 202 are modified based on the order received (203).

Subsequently, it is determined whether the destination station can receive data (204). If so, data read from the memory is transferred to the destination station (205). It is then determined whether data transmission has been completed (206). If not, data transmission continues. If so, data corresponding to the next priority order is read from the memory.

The method for determining a traffic priority order on a network based on traffic data size will be described with reference to FIG. 6. Note that similar steps are designated by like reference numerals in FIGS. 5 and 6. Thus, a discussion of steps 203–206 off FIG. 6 is omitted hereinafter. As illustrated in FIG. 6, the data size of traffic communicated between two stations is detected (301). If the data size is greater than a reference value, data being transmitted between the stations is determined to be multimedia data, which is granted the most significant priority order. By contrast, if the data size is lower than a reference value, data being transmitted between the two stations is determined to be normal data, which is granted a priority order lower than that granted multimedia data (302). More specifically, when mapped to the priority order determining function based on data size (see FIG. 4), the random point $\alpha$ is mapped along a vertical plane to the priority order determining function which corresponds to the priority order of 3.

Figure 5:
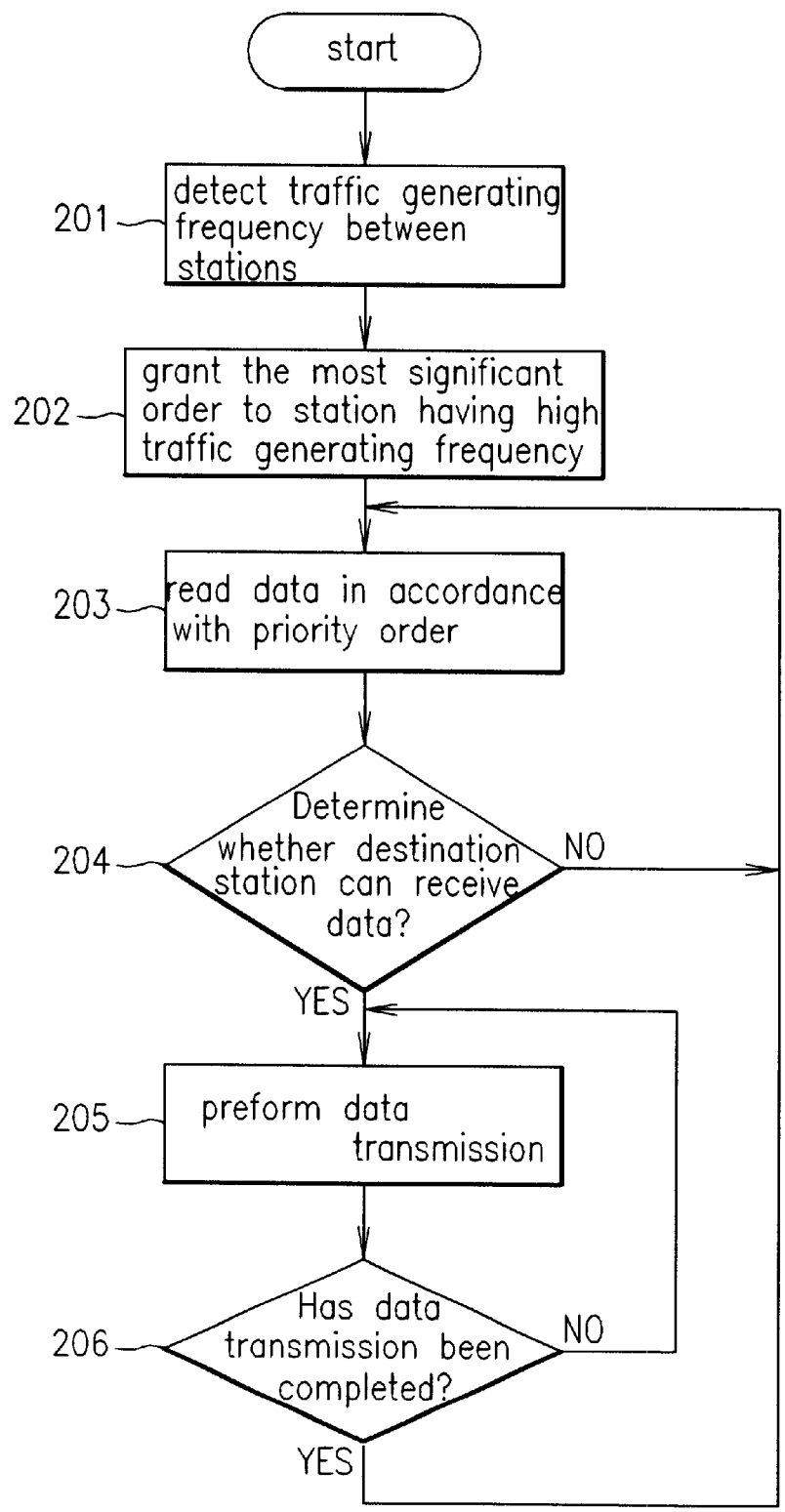
FIG. 5 is a flow chart illustrating a method for determining a traffic priority order on a network according to a first embodiment of the present invention.
Figure 6:
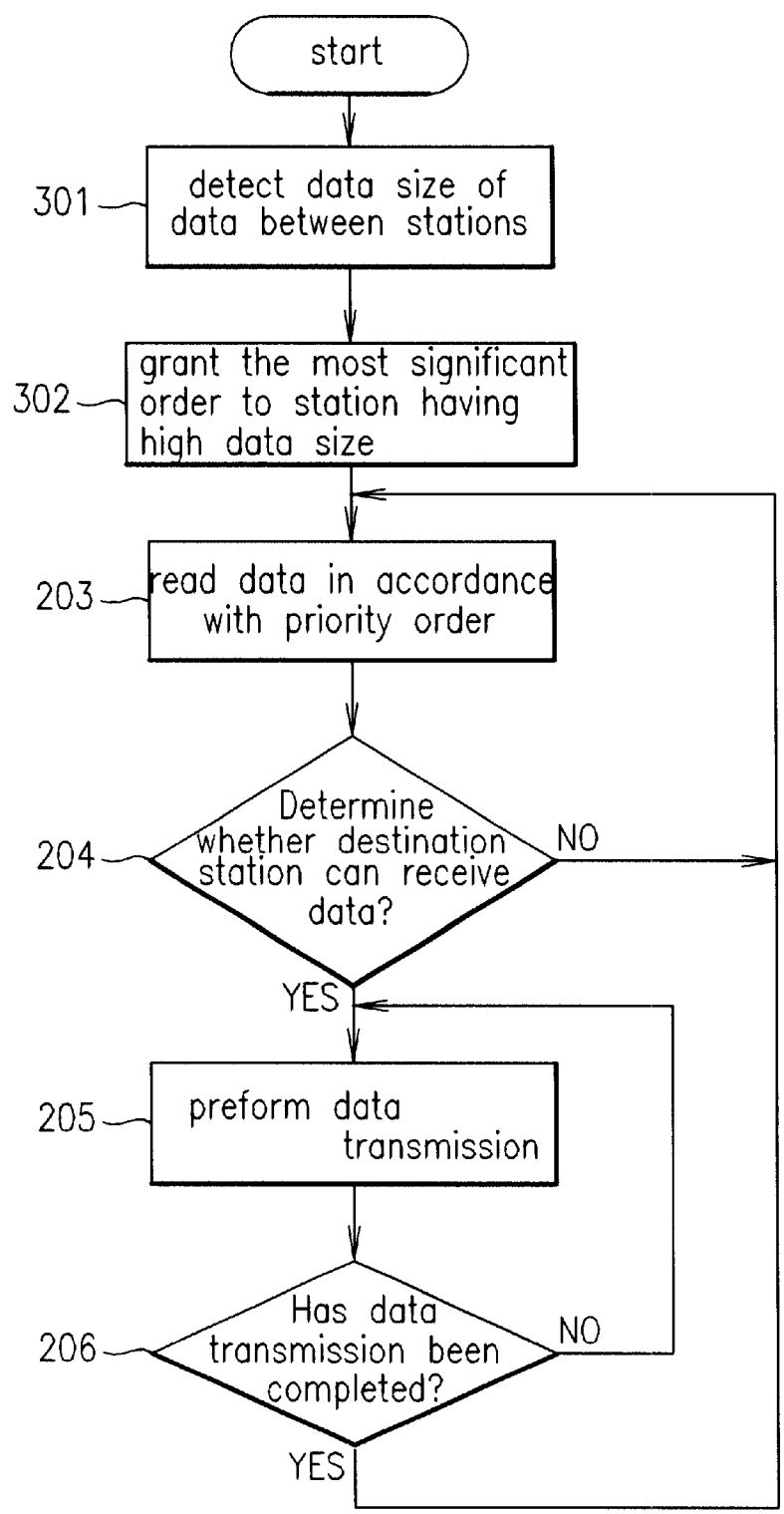
FIG. 6 is a flow chart illustrating a method for determining a traffic priority order on a network according to a second embodiment of the present invention.

Efficient transmission of multimedia data and normal data can be performed based on priority order while repeating the aforementioned steps of FIG. 5 or FIG. 6, or a combination thereof, where traffic generating frequency and data size are both detected and used to determine the traffic priority order.

The method for determining a traffic priority order on a network according to the present invention has at least the following advantages.

First, since the priority order is determined based on traffic generating frequency and the data size, it becomes less necessary to increase band width to accommodate real time processing of multimedia data. Thus, the life-span of network is increased.

Second, using the present invention, data codes corresponding to priority are not necessary in data packets. Thus, without increasing the size of a conventional data packet, additional data may be stored Third, since the priority order is determined based on multimedia data characteristics and normal data characteristics, network efficiency can be improved.

It will be apparent to those skilled in the art that various modifications and variations can be made in the method for determining a traffic priority order on a network of the present invention without departing from the spirit or scope of the invention. Thus, it is intended that the present invention cover the modifications and variations of the invention provided they come within the scope of the appended claims and their equivalents.

What is claimed is:

1. A method for determining a traffic priority order for data to be transmitted over a network, comprising:

detecting traffic generating frequency between respective stations; and granting priority order to data based on the detected traffic generating frequency, a higher priority order being granted when a higher traffic generating frequency is detected.

2. The method recited by claim 1, further comprising:

determining whether multiple data have been granted a same priority order.

3. The method recited by claim 2, further comprising:

changing a priority order among data determined to have been granted the same priority order, the priority order being changed based on an order that the data is received for transmission.

4. The method recited by claim 1, wherein the granting step comprises:

comparing the detected traffic generating frequency to a threshold, and granting a most significant priority order to data when the detected traffic generating frequency exceeds the threshold.

5. The method recited by claim 4, further comprising:

determining that data for transmission between respective stations is multimedia data if the detected traffic generating frequency is greater than the threshold; and determining that data for transmission between respective stations is normal data if the detected traffic generating frequency is lower than the threshold.

6. The method recited by claim 1, further comprising:

determining whether a destination station is ready to receive data;

reading data from a memory based on an associated priority order; and transferring the read data to the destination station when the destination station is ready to receive data.

7. A method for determining a traffic priority order for data to be transmitted over a network, comprising:

detecting a size of data to be transmitted between respective stations; and granting priority order to the data based on the detected data size, a higher priority order being granted when a greater data size is detected.

8. The method recited by claim 7, further comprising:

determining whether multiple data have been granted a same priority order.

9. The method recited by claim 8, further comprising:

changing a priority order among data determined to have been granted the same priority order, the priority order being changed based on an order that the data is received for transmission.

10. The method recited by claim 7, wherein the granting step comprises:

comparing the detected data size to a threshold, and granting a most significant priority order to data when the detected data size exceeds the threshold.

11. The method recited by claim 10, further comprising:

determining that data for transmission between respective stations is multimedia data if the detected data size is greater than the threshold; and determining that data for transmission between respective stations is normal data if the detected data size is lower than the threshold.

12. The method recited by claim 7, further comprising:

determining whether a destination station is ready to receive data;

reading data from a memory based on an associated priority order; and transferring the read data to the destination station when the destination station is ready to receive data.

13. An apparatus for determining a traffic priority order for data to be transmitted over a network, comprising:

means for detecting information including at least one of a traffic generating frequency and a size of data to be transferred between respective stations; and means for granting priority order to data based on the detected information, a higher priority order being granted when a higher information is detected.

14. The apparatus recited by claim 13, further comprising:

means for determining whether multiple data have been granted a same priority order.

15. The apparatus recited by claim 14, further comprising:

means for changing a priority order among data determined to have been granted the same priority order, the priority order being changed based on an order that the data is received for transmission.

16. The means recited by claim 13, wherein the granting means comprises:

means for comparing the detected information to a threshold, and means for granting a most significant priority order to data when the detected information exceeds the threshold.

17. The apparatus recited by claim 16, further comprising:

means for determining that data for transmission between respective stations is multimedia data if the detected information is greater than the threshold; and means for determining that data for transmission between respective stations is normal data if the detected information is lower than the threshold.

18. The apparatus recited by claim 13, further comprising:

means for determining whether a destination station is ready to receive data;

means for reading data from a memory based on an associated priority order; and means for transferring the read data to the destination station when the destination station is ready to receive data.

19. The method recited by claim 1, wherein the detecting step includes:

determining the traffic generating frequency over periods of time.

20. The apparatus recited by claim 13, wherein when the detected information includes traffic generating frequency, the means for detecting detects the traffic generating frequency over periods of time.

* * * * *